United States Patent [19]
Takaoka

[11] Patent Number: 6,130,776
[45] Date of Patent: Oct. 10, 2000

[54] OPTICAL MICROSCOPE WHICH HAS OPTICAL MODULATION ELEMENTS

[75] Inventor: Hideyuki Takaoka, Hachioji, Japan

[73] Assignee: Olympus Optical Co., Ltd., Tokyo, Japan

[21] Appl. No.: 09/300,478

[22] Filed: Apr. 28, 1999

Related U.S. Application Data

[62] Division of application No. 08/934,058, Sep. 19, 1997, Pat. No. 5,969,853.

[30] Foreign Application Priority Data

Sep. 19, 1996 [JP] Japan .................................. 8-247778

[51] Int. Cl.$^7$ .................................................. G02B 21/00
[52] U.S. Cl. .................... 359/370; 359/381; 359/370; 359/371; 359/385; 359/386; 359/821
[58] Field of Search .................... 359/370, 371, 359/385, 386, 381, 821

[56] References Cited

U.S. PATENT DOCUMENTS 2,660,923 12/1953 Benford .................................. 359/370
4,407,569 10/1983 Piller et al. ............................. 359/370

FOREIGN PATENT DOCUMENTS 51-128548 11/1976 Japan .
57-178212 11/1982 Japan .
8-94936 4/1996 Japan .

*Primary Examiner*—Cassandra Spyrou
*Assistant Examiner*—Euncha Cherry
*Attorney, Agent, or Firm*—Arnold International; Bruce Y. Arnold

[57] ABSTRACT

For observing transparent phase objects and the like, an optical microscope is provided with an aperture element 13 and an optical modulation element 14 that creates an image having the detecting sensitivity of the phase contrast imaging technique while simultaneously realizing an image having the three-dimensional sense provided by the modulation contrast imaging technique. In the present invention, the aperture is shaped as an angular segment of a circular ring that is centered on the optical axis and the corresponding optical modulation element includes either a light attenuating phase plate in the shape of a circular ring, or a light attenuating region in the shape of a circular ring with all other regions of the optical modulation element adding a phase retardation to the light passing therethrough.

10 Claims, 11 Drawing Sheets

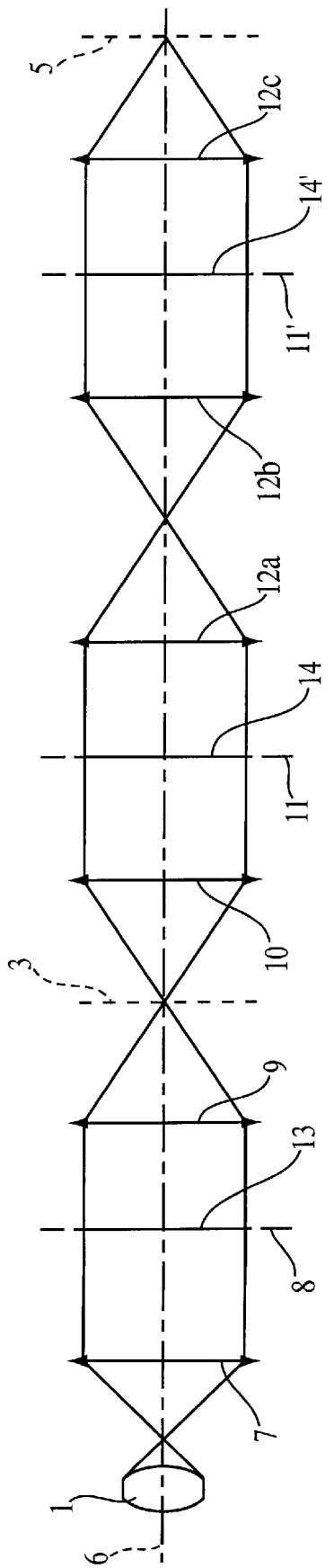
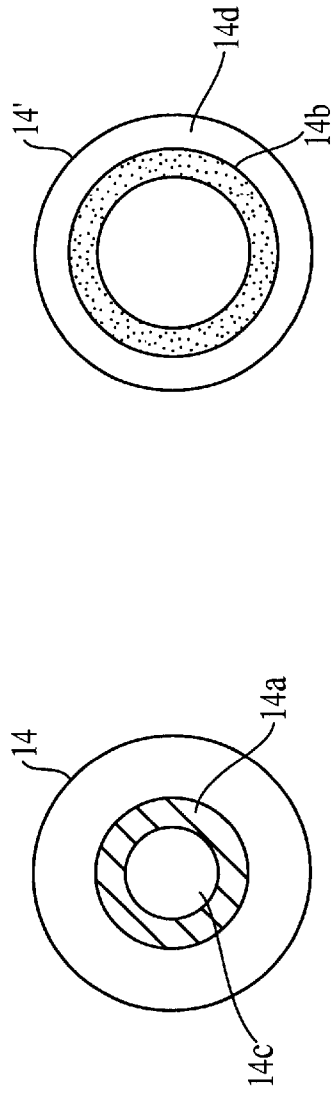
FIG. 4(a)
FIG. 4(b)
FIG. 4(c)

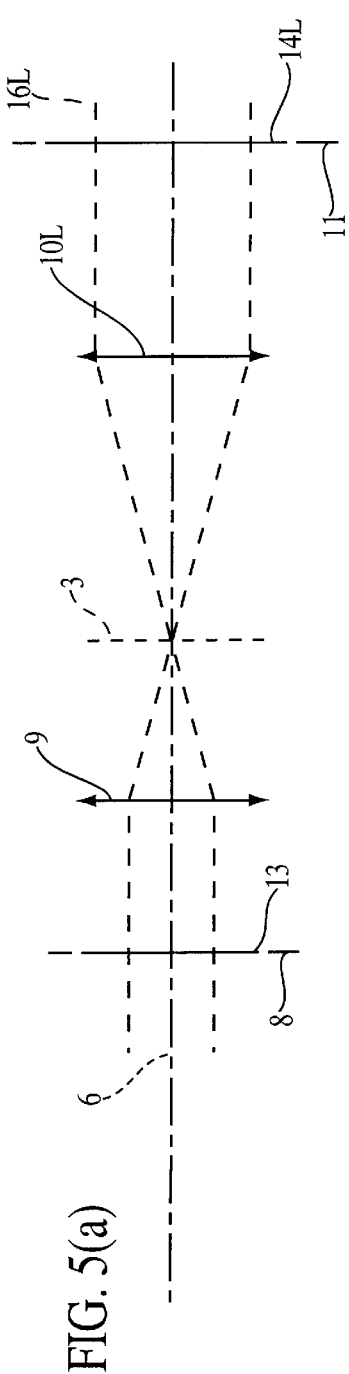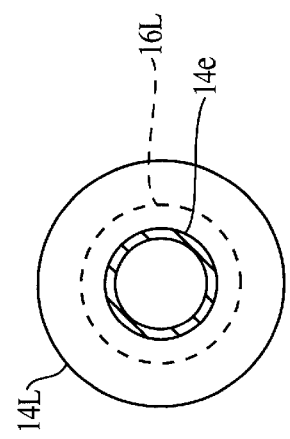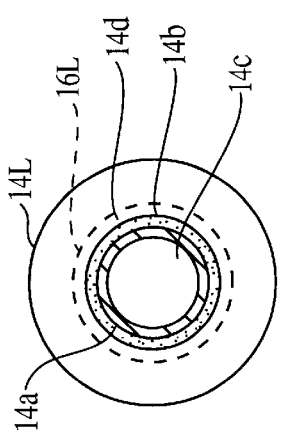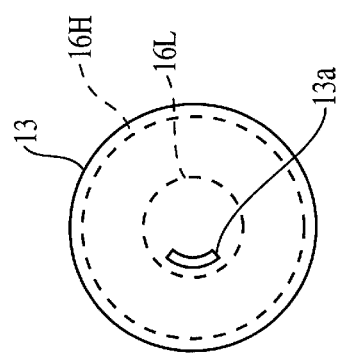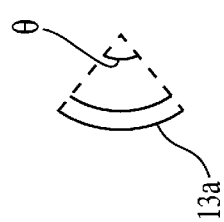
FIG. 5(a)
FIG. 5(b)
FIG. 5(c)
FIG. 5(d)
FIG. 5(e)

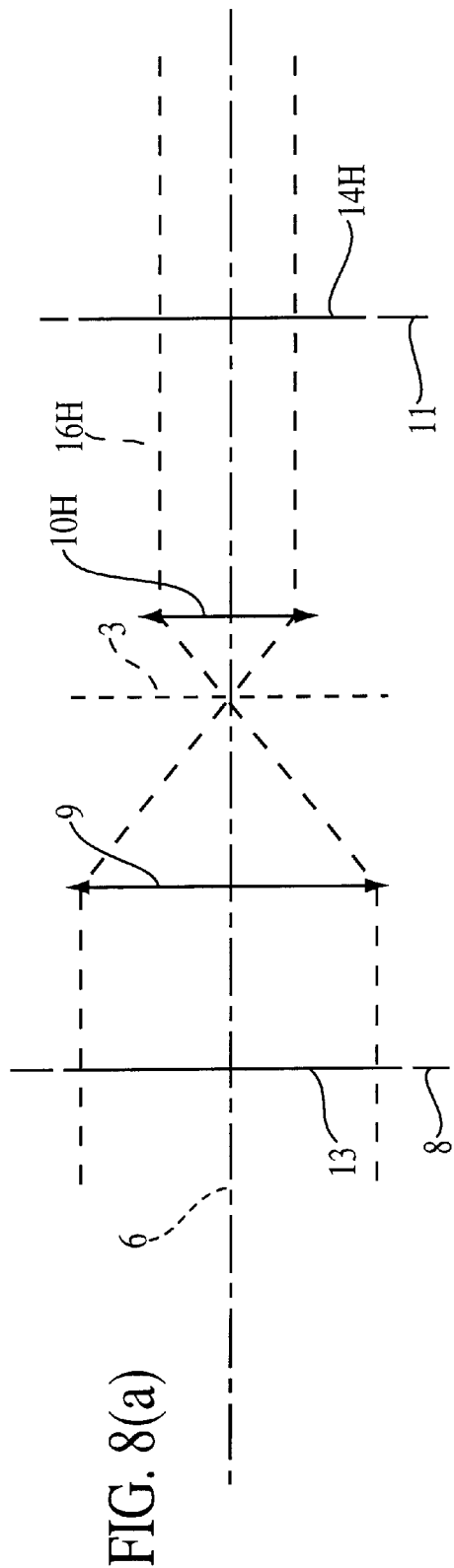
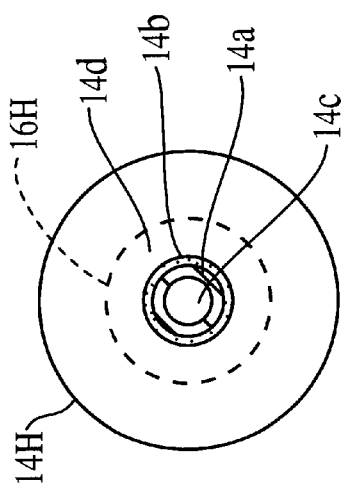
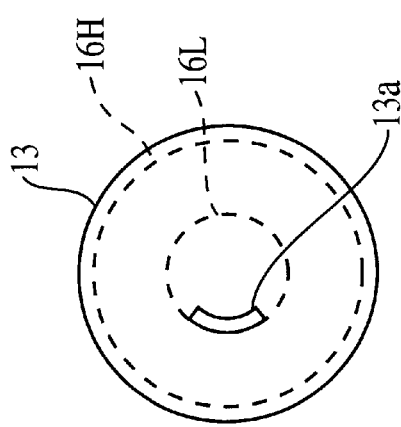
FIG. 8(a)
FIG. 8(b)
FIG. 8(c)

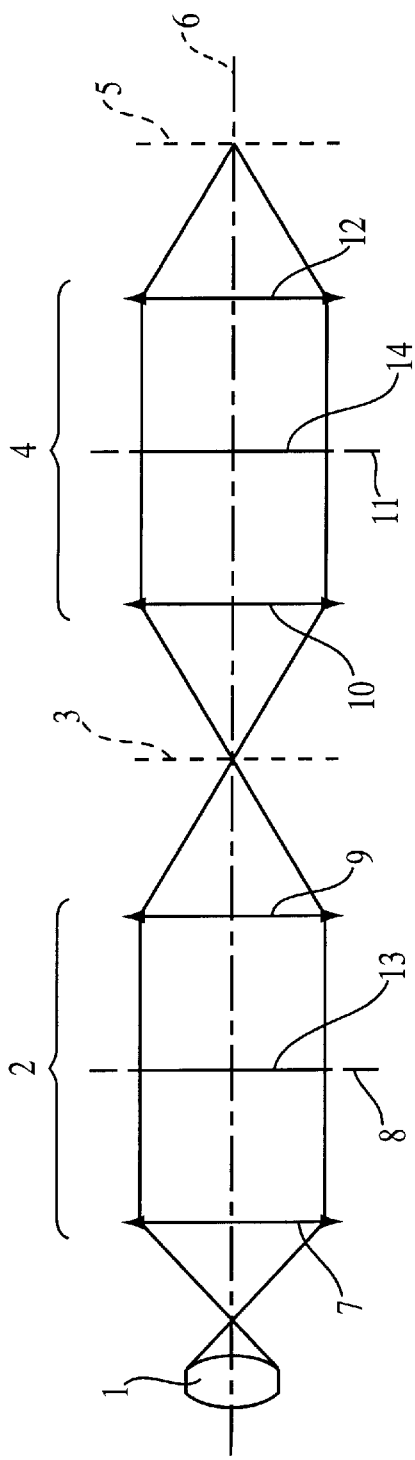
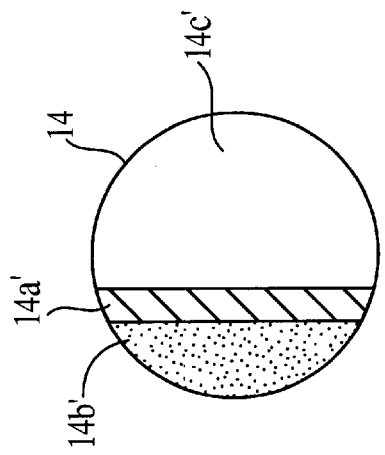
FIG. 9(c)
(PRIOR ART)
FIG. 9(a)
(PRIOR ART)
FIG. 9(b)
(PRIOR ART)

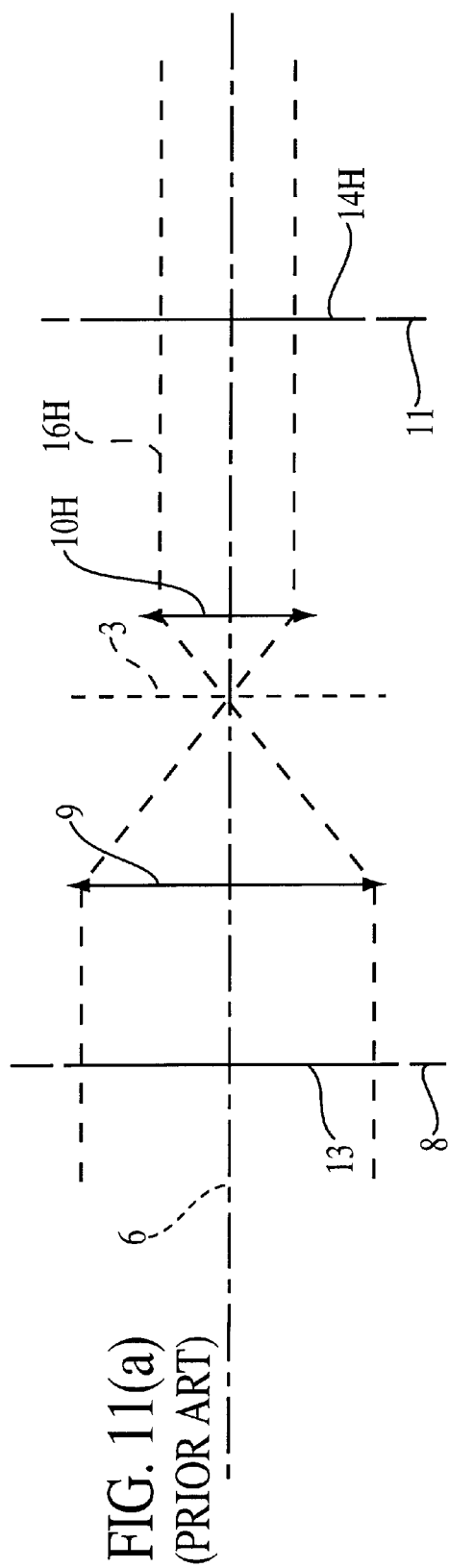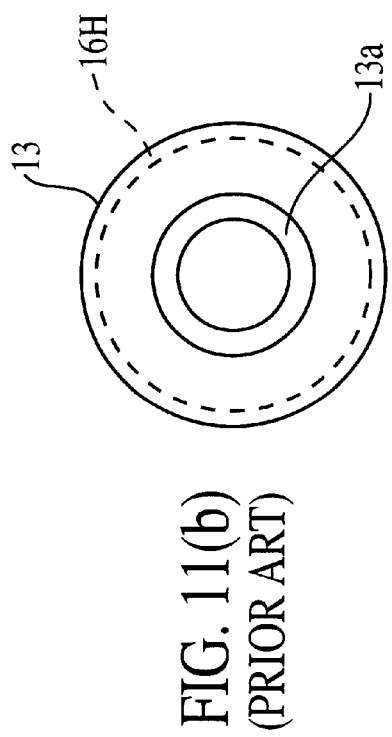
FIG. 11(a) (PRIOR ART)
FIG. 11(b) (PRIOR ART)
FIG. 11(c) (PRIOR ART)

OPTICAL MICROSCOPE WHICH HAS OPTICAL MODULATION ELEMENTS

CROSS REFERENCE TO RELATED APPLICATION

This is a divisional application of Ser. No. 08/934,058, filed Sep. 19, 1997, now U.S. Pat. No. 5,969,853.

BACKGROUND OF THE INVENTION

In the case where a colorless transparent phase sample such as a biological cell is desired to be observed using an optical microscope, the structure cannot be seen by using a bright-field view imaging technique. However, various imaging techniques are known that make such a phase sample visible. Examples of these are the phase contrast imaging technique, the modulation contrast imaging technique, the differential interference contrast (DIC) imaging technique, and so on.

The phase contrast imaging technique positions a ring ("ring" herein means—annular shape—) slit at a pupil plane of an illuminating optical system of a microscope, and arranges a phase-shifter (i.e., a layer which provides phase contrast) at a conjugate pupil plane of an image-forming optical system of the microscope. The relative phase delay of the light diffracted by the phase structure of the sample is only $\pi/2$ radians as compared to the zero-order light. The phase-shifter is positioned at the region where the zero-order light passes in order to negate the phase difference between the zero-order light and the diffracting light. Thus, an image of the phase structure becomes visible.

In general, light attenuation of an appropriate amount is provided on the phase-shifter, and the contrast in the image is thus increased by having the zero-order light intensity and the light intensity of the diffracted light carefully controlled. This has the advantage that an image with distinctive contrast can be observed with high detection sensitivity even for minute structures such as the granular shapes inside of cells. On the other hand, a disadvantage is that the ends of the structures are seen as shining white, due to a phenomenon called halo, and thus the detection of the outline of the structures becomes difficult.

On the one hand, the modulation contrast imaging technique arranges an aperture slit at a pupil plane of an illuminating optical system of the microscope, as indicated in Japanese Patent Publication 51-128548, and arranges multiple regions with differing transmittances on an optical modulation element positioned at a conjugate pupil plane of an image-forming optical system of the microscope. Usually, a light absorbing layer is provided so that it has an appropriate transmittance at the conjugate region to the aperture slit. A region adjacent one side of this conjugate region is made to be a light transmitting region and the region on the other side is made to be a shaded (i.e., light blocking) region. In the pupil plane, the position where light from the slit passes varies depending on the structure in the sample so that the phase structure can be observed with shading. Advantages of the modulation contrast imaging technique are that an image having a three-dimensional sense is obtained and little expense is incurred in practicing this imaging technique. Also, this imaging technique is well-suited for manipulating cells and the like in that one can easily view the outline of the structures with no halo. On the other hand, a disadvantage of the modulation contrast imaging technique is that the discerning of minute structures is difficult, and that the detection sensitivity is inferior in contrast to the phase contrast imaging technique. In addition, whenever the objective lens is exchanged, a complicated operation must be done in order to align the aperture slit and the conjugate region thereto of the optical modulation element (i.e., the absorbing layer).

In the DIC imaging technique, a sample is illuminated by two polarized light beams having respective polarizations which are orthogonal to each other by using a birefringent crystal. This technique allows minute structures of the samples to be viewed as a result of the minute structures affecting the polarization of the light. The polarized light from the samples is made to interfere. The advantage of the DIC imaging technique is that a three-dimensional sense is rendered to the image having extremely high contrast. On the other hand, a disadvantage is that the equipment becomes expensive as a result of using the birefringent crystals. And, in the case where the sample itself or a substrate supporting the sample affects the polarization of light, an accurate image can not be obtained. For example, the DIC imaging technique is not generally suitable for observing samples through plastic surfaces because plastic can itself change the polarization of the light.

As explained above, in each prior art technique for imaging phase samples there are disadvantages that arise in addition to the advantages. Thus, an imaging technique is desired to avoid the disadvantages while attaining the advantages.

Especially in the case where examining and manipulating biological samples and the like are performed under a microscope, it is necessary to detect even transparent, minute structures with a high sensitivity. Moreover, in order to perform accurate manipulation of minute objects and the like, the outlines of the structures must be clearly visible. Also, it is important to be able to perform observations without the influence of the characteristic on polarization of samples or substrates. Further, there is a strong need to eliminate adjusting operations on complex optical systems arising from exchanging objectives of a microscope, as is frequently the case while observing microscopic structures. Thus, it is desirable to be able to detect and manipulate samples easily and efficiently.

There have been attempts in the prior art to achieve the above goals, in an inexpensive manner, by combining aspects of the prior art modulation contrast technique and the phase contrast technique. An example of such an attempt is given below.

In an embodiment of Japanese Patent Publication 57-178212, a slit aperture is arranged at a pupil plane in a position displaced outward from the optical axis and oriented normal to the direction of displacement from the optical axis. A light absorbing, phase-shifter having an appropriate transmittance is provided on an optical modulation element that is located at a pupil plane which is conjugate to this aperture. Also, as an another embodiment, among the regions adjoining the light absorbing, phase-shifter, the transmittance drops in at least one of the adjoining regions in the direction outward from the optical axis. In both of the embodiments, one of the positive/negative first-order diffracted light components is blocked. Thus, diffracted light that contributes to the image is allowed to pass on only one side of the light absorbing, phase-shifter which passes the zero-order light. In general, the contrast of the image using this technique drops as a result of the diffracted light on one side region in relation to the zero-order light being entirely blocked. For example, there is consideration of a thin flat phase object where the phase distribution is a sine wave with the period 1/p. The equiphase wave surface Φ(x) of the light that passed through this object can be represented as follows $$\Phi(x) = A \cos(2\pi p x)$$

wherein,
x is the axis direction parallel to the object, and A is the amplitude of the phase distribution. Then, the complex amplitude distribution E(x) on the phase object can be considered:

$$E(x) = \exp\{i\,\Phi(x)\}$$

For a small phase change, i.e., when A<<1, $$E(x) = 1 + iA\cos(2\pi p x)$$
$$= 1 + (A/2)\exp(i\pi/2 + 2\pi i p x) +$$
$$(A/2)\exp(i\pi/2 - 2\pi i p x)$$

The above first term is the zero-order light, the second term is the positive first-order light, and the third term is the negative first-order light. When the phase difference of π/2 radians between the zero-order versus the positive/negative first-order light is negated using a phase-shifter, the above equation becomes the below equivalent value E'(x).

$$E'(x) = 1 + (A/2)\exp(2\pi i p x) + (A/2)\exp(-2\pi i p x) \quad \text{Equation (1)}$$

In equation (1), when the negative first order light is blocked:

$$E''(x) = 1 + (A/2)\exp(2\pi i p x) \quad \text{Equation (2)}$$

The respective intensities of equations (1) and (2) are given as I' (x) and I" (x), as indicated below.

$$I'(x) = |E'(x)|^2 \approx 1 + 2A\cos(2\pi p x) \quad \text{Equation (3)}$$

$$I''(x) = |E''(x)|^2 \approx 1 + A\cos(2\pi p x) \quad \text{Equation (4)}$$

Therefore, in comparing the blocking of one of the positive/negative first order light components from contributing to the image (as in equation (4)), to the case where there is no blocking of these light components (as in equation (3)), the contrast drops to approximately one-half. Thus, based on the structure indicated in Japanese Patent Publication 57-178212, even though modulation contrast imaging occurs, the advantage of a high detecting sensitivity as obtained in the phase contrast imaging technique is not obtained.

In general, in the modulation contrast imaging technique, relative to the direct light (i.e., the non-refracted light by a sample), the transmittance drops in all the light that is passed to one side, since a light absorbing layer is arranged to attenuate this light. This provides contrast so as to allow a phase object to be viewed, with the contrast having the difference of brightness in the direction of refraction by the sample. In Japanese Patent Publication 51-128548, an example of a transmittance distribution of the light absorbing region on an optical modulation element which is used by the modulation contrast imaging technique is shown. The region that the direct (i.e., zero order) light passes through on the optical modulation element is at the center. A region on one side adjoining this region has low transmittance. In such cases, even though there is contrast in an image of the phase object, the resolving power drops as a result of about half of the light flux that passes through the pupil plane being obstructed and thus not contributing to the image. In order to avoid decreasing the resolving power, in general, apertures are arranged displaced outward from the optical axis and the regions having low transmittance are narrowed. By said patent, each region on the optical modulation elements can have a phase shift effect. However, also in this case, as a result of the diffracted light being obstructed as compared to the zero-order light, the efficacy of the phase contrast technique is low, just like that of previously mentioned Japanese Patent Publication 57-178212.

Furthermore, in the above cases, because of having an asymmetric region on an optical modulation element in relation to the optical axis, every time the objective lens is exchanged, an adjusting operation must be done in order to match the alignment of the aperture and the optical modulation element. Specifically, in the case where the optical modulation element is arranged at a pupil plane interior of the objective lens, because the alignment of the optical modulation element is not necessarily uniform in a fixed direction with respect to each objective lens when the objective lens is attached on the revolver, the aperture must be realigned to each objective lens when the objective lens is exchanged. Also, along with changing the objective lens, the aperture must also be changed since the required aperture differs based on the magnification of the lens. In using a microscope the magnification is frequently switched, and every time this occurs an exchange operation of the aperture is required.

In U.S. Pat. No. 4,407,569, a phase shift region and a light absorbing region are independently prepared for selective insertion at a pupil plane of the image-forming optical system and, based on a suitable exchanging of the apertures that respectively correspond, one can selectively switch between the phase contrast image and the modulation contrast image. Therefore, both the phase contrast effect and the modulation contrast effect cannot be realized at the same time. In one embodiment of this patent, it is also disclosed that there are two respective apertures, one for phase contrast imaging and one for modulation contrast imaging, on the same element. However, based on this construction, there is a difficulty in simultaneously imaging using both techniques. The reason is that the zero-order light from the aperture for phase contrast imaging receives a phase shift, although the zero-order light from the aperture for modulation contrast imaging does not have such a phase shift. Therefore, the interference effect of the zero-order light and the diffracted light is diminished and the contrast in the image is reduced. Even if the light absorbing regions for modulation contrast imaging were given a phase shift as well, the interference effect between the zero-order light and the diffracted light would be less than desirable as a result of expanding the region in which the diffracted light is given a phase shift.

On the one hand, in order to control the characteristic halo in the phase contrast imaging technique, a phase contrast microscope that employs a light absorbing region apart from the phase shifter at a pupil plane is described in Japanese Patent Publication 8-94936. However, the obtaining of the effect of the modulation contrast by said phase contrast microscope is not shown. In fact, because the shape of the aperture is also restricted to a ring, a modulation contrast image is not obtained. Also, even where nothing is clearly shown specifically concerning the position and width, etc., of the light absorbing regions which are arranged on optical modulation elements, the effects of both the phase contrast image and the modulation contrast image cannot be simultaneously obtained based on Japanese Patent Publication No. 8-94936. In summary, both the three-dimensional sense of the modulation contrast imaging technique and the high detection sensitivity of the phase contrast imaging technique were not able to be simultaneously attained by techniques that were suggested in the prior art.

As an example that reduces the exchanging operation of the aperture accompanying the changing of the objective lens, a ring slit of Leica is given. As for the ring slit, the exchanging of the ring slit is not necessary when there are changes of the respective magnifications because the ring slit corresponds to magnifications of 10× to 40×. However, because the aperture shape is a ring, when there is use of a high magnification objective lens, the effective numerical aperture on the illuminating side of the microscope is small, and the resolving power drops. Also, the halo becomes stronger and it becomes difficult to detect the outline of the structure of the samples.

On the one hand, in order to increase the resolution upon enlarging the illuminating ring slit diameter when a low magnification objective lens is used, the region where the zero-order light passes through the pupil plane of the image-forming optical system becomes larger. Because of this, there is a problem of diminished contrast.

BRIEF SUMMARY OF THE INVENTION

The present invention relates to an optical microscope that employs optical modulation elements.

A first object of the present invention is to provide an image of transparent phase objects not only with a three-dimensional sense, as in the modulation contrast imaging technique, but also with a high imaging sensitivity, as in the phase contrast imaging technique.

A second object of the invention is to make switching operations of the aperture elements unnecessary, when the first object is attained with the objective lenses that cover a wide range of magnification, so that the observer's bothersome work is reduced.

BRIEF DESCRIPTION OF THE DRAWINGS

FIG. 2(d) is another example of an optical modulation element that can be used with the aperture element illustrated in FIG. 2(a), and FIG. 2(c) is a blow-up of the pie-shaped section shown in dotted lines in FIG. 2(b).

FIG. 4(a) illustrates the components and ray paths of another microscope, for viewing an object in transmitted light and employing the present invention. The microscope includes a relay optical system attached to the image-forming optical system. The relay optical system allows the use of two optical modulation elements in separated pupil planes, as illustrated. FIG. 4(b) illustrates an optical modulation element 14 for use in pupil plane 11, and FIG. 4(c) illustrates another optical modulation element 14' for simultaneous use in pupil plane 11'. The relay optical system has the effect of superposing the optical modulation elements 14, 14'.

FIG. 5(a) illustrates the layout of components and ray paths for a portion of an optical system according to another embodiment of the invention in the case where a low magnification objective lens is used. FIG. 5(b) illustrates an aperture element according to this embodiment of the invention for use in the low magnification optical system of FIG. 5(a). FIG. 5(c) illustrates details of the aperture element of FIG. 5(b), and FIG. 5(d) illustrates an optical modulation element for use with the aperture element of FIG. 5(b). FIG. 5(e) is an example of another optical modulation element for use with a low magnification objective lens and light aperture as in FIG. 2(b).

FIG. 7(a) illustrates the layout of components and ray paths for a portion of the optical system, FIG. 7(b) illustrates an aperture element having improved performance as compared to the aperture shown in FIGS. 5(b) and 6(b), and FIG. 7(c) illustrates a corresponding optical modulation element.

FIGS. 8(a)–8(c) illustrate another example of an optical system in the case where a high magnification objective lens is used for attaining the second object of the present invention. FIG. 8(a) illustrates the layout of components and ray paths for a portion of the optical system, FIG. 8(b) illustrates an aperture element that is identical to that of FIG. 7(b), and FIG. 8(c) illustrates a corresponding optical modulation element.

FIGS. 9(a)–9(c) illustrate a prior art modulation contrast imaging system, with FIG. 9(a) showing the layout of components and ray paths for the entire structure, FIG. 9(b) illustrating the aperture element, and FIG. 9(c) illustrating the optical modulation element.

FIG. 10(a) shows the layout of components and ray paths for a portion of the optical system. FIG. 10(b) illustrates an aperture element having a ring-shaped aperture, and FIG. 10(c) illustrates a corresponding optical modulation element.

FIGS. 11(a)–11(c) illustrate a portion of a prior art optical system which uses a high magnification objective. FIG. 11(a) shows the layout of components and ray paths for a portion of the optical system, FIG. 11(b) illustrates an aperture element having a ring-shaped aperture, and FIG. 11(c) illustrates a corresponding optical modulation element.

DETAILED DESCRIPTION

In order to attain the first object of the invention, an optical microscope of the present invention includes a light source, an illuminating optical system for illuminating the sample, an aperture which is arranged at the pupil plane of the illuminating optical system or in that vicinity, an image-forming optical system that includes an objective lens for forming a magnified image of a sample for observation, and at least four light control regions arranged at one or more pupil planes of the image-forming optical system. The four regions include a first light absorbing region having a transmittance Ta where one part or the entirety of a conjugating region to the aperture are included, a second light absorbing region having a transmittance Tb which is positioned adjacent to the first light absorbing region, a first light transmitting region having a transmittance Tc which is positioned adjacent to the first light absorbing region, and a second light transmitting region having a transmittance Td, wherein the region on at least one optical modulation element has a phase shift effect, the second light transmitting region is positioned in relation to the second light absorbing region so as to be adjacent to the second light absorbing region on the side approximately opposite to the first light absorbing region, and wherein the following conditional equations are satisfied:

| | |
|---|---|
| Tb<Ta<Tc | Equation (5) |
| Ta<Td | Equation (6) |
| Tc>0.5 | Equation (7) |
| Td>0.5 | Equation (8) |

Also, an optical microscope is provided which has a light source, an illuminating optical system for illuminating a sample, an aperture element that is positioned at a pupil plane of the illuminating optical system or in that vicinity and which includes an aperture in a shape of an angular segment of a ring that is centered on the optical axis, an image-forming optical system that includes multiple objective lenses for forming an image of a sample having a selected magnification for observation, and one or more optical modulation elements positioned at one or more pupil planes, each optical modulation element having at least two light control regions that are arranged at different distances from the optical axis, and the following conditional equation being satisfied:

| | |
|---|---|
| NAc>0.7NAo | Equation (9) | wherein,

NAc is the numerical aperture value subtended by the region of an optical modulation element having the smallest angular subtense from the sample surface, NAo is the lowest value of numerical aperture of the multiple objective lenses of the microscope, and at least one of the light absorbing regions includes a phase plate region (i.e., a region having a phase shift effect) which is the shape of a ring that is centered on the optical axis, and only one said aperture element is used in common with each objective lens.

Figure 1A:
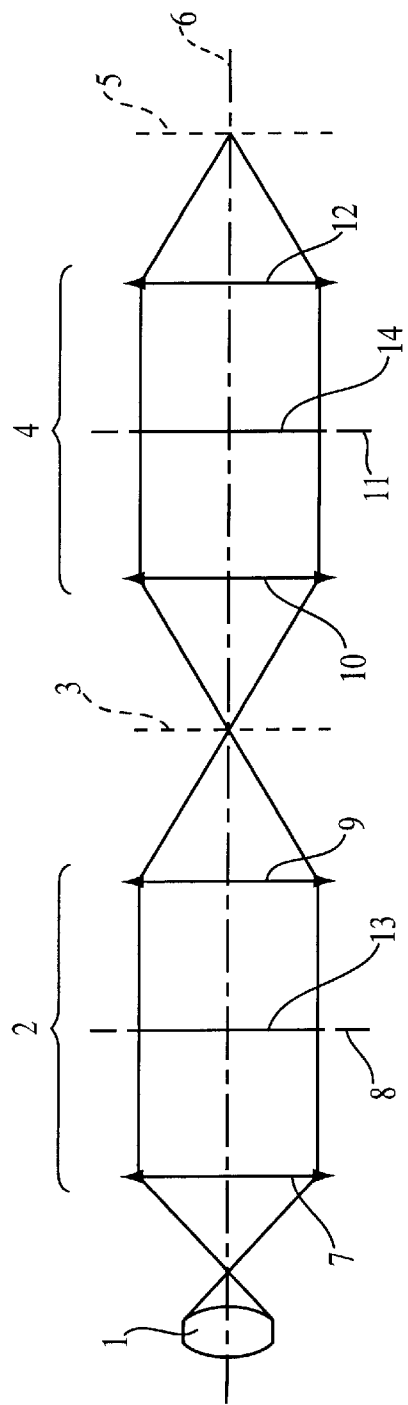
FIG. 1(a) illustrates the layout of components and ray paths of an optical microscope for viewing an object in transmitted light having an illuminating optical system and an image-forming optical system that are aligned, and with aperture elements and optical modulation elements designed according to the present invention.

The operation of the invention will now be described with reference to the Figures. FIG. 1(a) shows the layout of the components of an optical microscope of the present invention when in use, wherein there is provided a light source 1, an illuminating optical system 2, a sample 3, an image-forming optical system 4, a collector lens 7, a pupil plane 8 of the illuminating optical system, a condenser lens 9, an objective lens 10, a pupil plane 11 of the image-forming optical system, an image-forming lens 12, an aperture element 13, and an optical modulation element 14. An image of the sample is formed at 5, and 6 is the optical axis. The optical microscope of the present invention forms an image 5 of sample 3 while using the combination of aperture element 13, which is arranged at pupil plane 8 of illuminating optical system 2 or in that vicinity, and optical modulation element 14 which is arranged at pupil plane 11 of image-forming optical system 4 or in that vicinity.

Figure 1C:
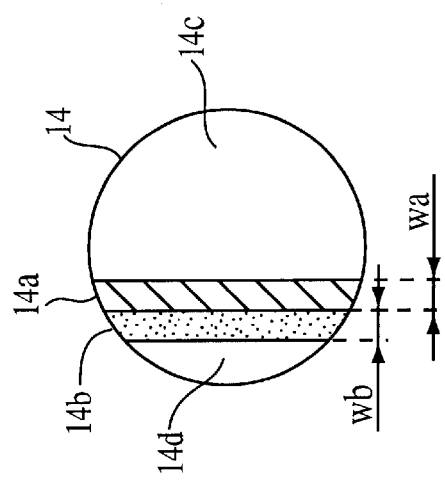
FIG. 1(b) illustrates an aperture element, and FIG. 1(c) illustrate the design of a corresponding optical modulation element according to the present invention.
Figure 1B:
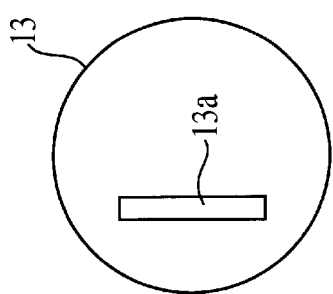

FIG. 1(b) illustrates one example of an aperture element 13 with aperture 13a.

FIG. 9(c) illustrates one example of a prior art optical modulation element 14 having regions 14a', 14b' and 14c'. Such an optical modulation element is generally used in the prior art modulation contrast imaging technique as the corresponding optical modulation element for the aperture 13a as shown in FIG. 1(b). When the transmittances of the regions 14a', 14b', and 14c' are given in order as Ta', Tb', and Tc', the following conditional equation is usually satisfied in the prior art modulation contrast imaging technique.

$$Tb'<Ta'<Tc'$$

On the one hand, FIG. 1(c) illustrates an example of an optical modulation element 14, having four regions as the corresponding optical modulation element for the aperture 13a of FIG. 1(b) according to the present invention. This optical modulation element 14 has a first light absorbing region 14a, a second light absorbing region 14b, a first light transmitting region 14c, and a second light transmitting region 14d, and the respective transmittances Ta, Tb, Tc, Td satisfy conditional equations (5)–(8).

In the modulation contrast imaging technique of the prior art, as shown in FIG. 9, the direct light from aperture 13a (FIG. 9(b)) which was not refracted or diffracted by sample 3 passes through the interior of region 14a' on optical modulation element 14. Other light which was refracted or diffracted by the sample passes through regions 14b' or 14c', which regions are adjacent to region 14a'. Given this, region 14b' has a transmittance lower than region 14a', causing the intensity of the light passing through region 14b' to be weakened. On the other hand, region 14c' has a higher transmittance than region 14a'. Therefore, contrast forms in the image corresponding to the refractive index distribution of the sample. Thus, the prior art modulation contrast imaging technique is performed.

The effect of the modulation contrast imaging technique can also be obtained when the optical modulation element 14 of FIG. 1(c) is used according to the present invention. In other words, in FIG. 1(c), the direct light from the sample passes through region 14a, and by means of regions 14b and 14c (which are also adjacent to region 14a), modulation contrast imaging occurs even when using the optical modulation element of the present invention. Both the modulation contrast imaging and the present invention can be given the effect of the phase contrast imaging by allowing region 14a or 14a' to have a phase shift.

But, in the present invention, by additionally providing a second light transmitting region 14d, the advantages of the phase contrast imaging technique can be combined with the modulation contrast imaging technique so as to yield improved imaging as compared to prior art imaging techniques.

Compared to the case where a second light transmitting region 14d is not provided, the present invention increases the phase contrast imaging efficacy. In short, by providing second light transmitting region 14d, the present invention attains a high detecting sensitivity because light passing through this region (being remote from the optical axis) contains the higher spatial frequency components which, rather than being blocked as in the prior art, now contribute to the image. In other words it is the higher spatial frequency components that contain the information concerning minute structures on the sample, and this light is no longer prevented from contributing to the image. Therefore, when optical modulation element 14 of FIG. 1(c) pertaining to the present invention is used, one obtains a higher phase contrast efficacy of detecting sensitivity than when the optical modulation element 14 of FIG. 9(c) is used.

In Japanese Patent Publication 51-128548, it was disclosed that each light absorbing region used for modulation contrast imaging may have the phase shift effect. However, there is no disclosure concerning providing a second light transmitting region as is done in the present invention. And further, there is no disclosure concerning a high phase contrast efficacy being obtained as a result of providing this region.

Therefore, as per the present invention, by providing a second light transmitting region 14d adjoining the second light absorbing region 14b, the efficacy of both the primary modulation contrast imaging technique and the phase contrast imaging technique can simultaneously be realized. This enables the ends of the structures of the phase sample to be clearly observed, and an image having a three-dimensional sense where shadows appear to have formed on the structure can be obtained. It also allows observation with a high detecting sensitivity of such things as minute structures, objects of low refractive indices, and the like.

In the construction of the present invention, it is desirable to provide a phase shift as mentioned above at the previously mentioned first light absorbing region. Instead of a phase delay being applied at the first absorbing region, all the other regions of the optical modulation element could instead be made to impart a phase shift. However, such an approach causes the manufacturing of the phase-shifter to become more complicated.

In the construction of the present invention, the second light absorbing region is made to be a shading (i.e., light blocking) layer, and it is desirable for the transmittance of the first light transmitting region and the second light transmitting region to be above 90%. This allows the contrast in the image to be increased even more.

Also, it is desirable for the first light absorbing region and said second light absorbing region on the optical modulation element to be positioned in a direction approximately radial (i.e., orthogonal) to the optical axis. This is because contrast formation in the present invention is in a direction parallel to the alignment of the first light absorbing region and the second light absorbing region, and the direction that most light is diffracted into is also the same radial direction. Also, in relation to a direction orthogonal to the optical axis, it is desirable for the width Wa of the first light absorbing region and the width Wb of the second light absorbing region to satisfy the following conditional equation:

$$Wa/2 < Wb < 2Wa \qquad \text{Equation (10)}$$

The most suitable resolving power and contrast can be obtained by satisfying the above conditional equation. When Wb exceeds 2Wa, the contrast is low because the quantity of the diffracting light is low, and also, when Wb drops below Wa/2, the three-dimensional sense is vague and the modulation contrast efficacy drops.

Moreover, it is desirable for there to be provided an aperture element having an aperture shaped so as to be an angular segment of a ring centered about the optical axis, and it is desirable for the optical modulation element to have a first light absorbing region and a second light absorbing region that are shaped as rings of different sizes and centered on the optical axis. Thus, the arrangement of each region on the optical modulation element becomes rotationally symmetric about the optical axis, and it becomes unnecessary to adjust the alignments of the optical modulation elements with the aperture shape. Also, even in the case where observations with various directions of contrast in the image are required, one may merely rotate the aperture element without any further need to rotate or align the optical modulation element(s).

The manner in which the second object of the invention may be attained will now be explained with reference to the drawings.

Figure 10A:
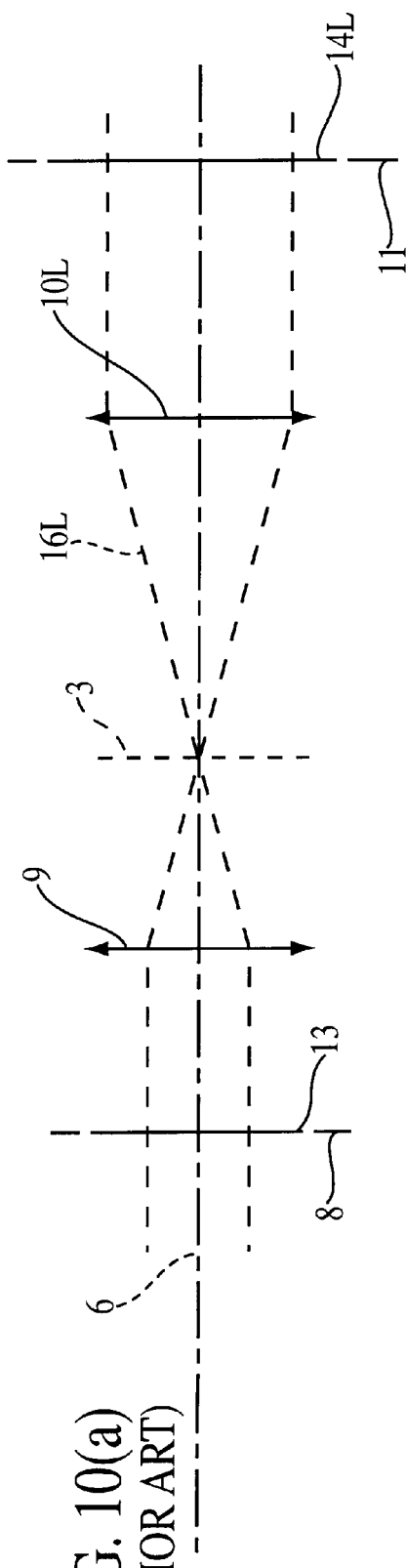
FIGS. 10(a)–10(c) illustrate a portion of a prior art optical system which uses a low magnification objective lens.
Figure 10B:
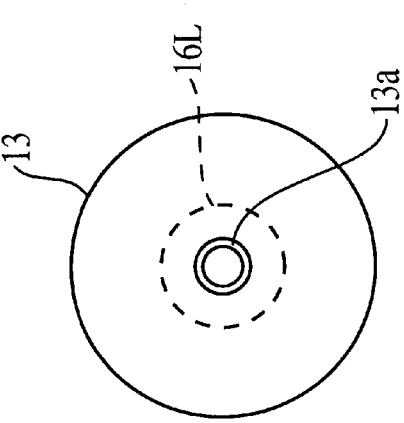
Figure 10C:
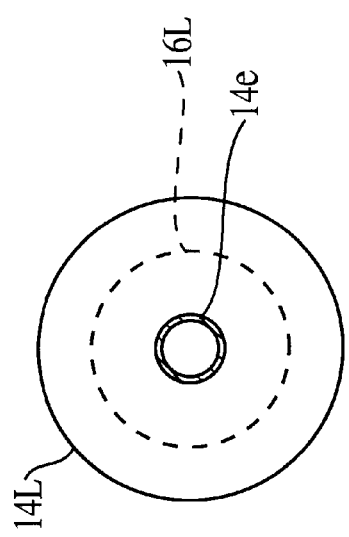

FIGS. 10(a)–10(c) illustrate a portion of a prior art phase contrast imaging system using an objective lens which has the smallest numerical aperture among multiple objective lenses in use. FIG. 10(a) shows the layout of components and ray paths for a portion of the construction, FIG. 10(b) illustrates the aperture element, and FIG. 10(c) illustrates the corresponding optical modulation element. The portion of the construction illustrated in FIG. 10(a) is from pupil plane 8 of the illuminating optical system to pupil plane 11 of the image-forming optical system when objective lens 10L is used which has the smallest numerical aperture (and generally the lowest magnification) among multiple objective lenses in use. At pupil plane 8 of the illuminating optical system, the region where light flux 16L passes through a diameter corresponding to the numerical aperture of objective lens 10L is the region of efficacy. More specifically, because the numerical aperture of low magnification objective lenses is small, only the region in the vicinity of the optical axis at or near the pupil plane of the illuminating optical system becomes effective. This figure shows light flux 16L using a dashed line.

On the one hand, FIGS. 11(a)–11(c) illustrate the same prior art optical system as in FIG. 10, but when a high magnification objective lens 10H is in use. Because the numerical aperture of a high magnification objective lens is high, at the pupil plane 8 of the illuminating optical system, the region where a light flux 16H passes is larger than when the low magnification objective lens is used.

In a phase contrast imaging technique of the prior art, the inner and outer diameters of the ring-shaped, phase-shifter which is arranged at the pupil plane 11 of the image-forming optical system are sized to the numerical aperture of the objective lens so that the most appropriate phase contrast efficacy can be obtained in relation to the pupil diameter of the objective lens in use. Because of this, the outer and inner ring diameters corresponding to the light absorbing, phase-shifter also generally differ according to the numerical aperture of the objective lens in use. FIG. 10(b) and FIG. 11(b) respectively illustrate the ring slits of aperture elements corresponding to when a low magnification objective lens versus when a high magnification objective lens is used. FIG. 10(c) and FIG. 11(c) illustrate corresponding optical modulation elements 14L and 14H which are arranged at the pupil plane of the objective lens and which each includes a ring-shaped phase shifter 14e''.

Therefore, whenever there is an exchanging of an objective lens to change the viewing magnification, the ring slit must also be exchanged. In cases where there is frequent switching of the magnification while observing a sample, the exchanging of the ring slit becomes extremely burdensome. This is not limited to the phase contrast imaging technique, as the modulation contrast imaging technique and the like all have this common problem.

Figure 6A:
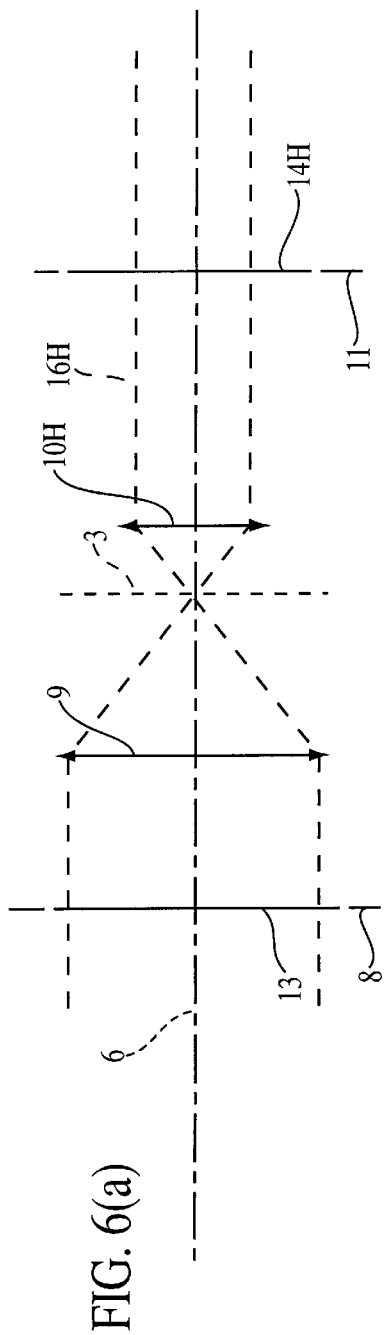
FIG. 6(a) illustrates the layout of components and ray paths for a portion of an optical system in the case where a high magnification objective lens is used for attaining the second object of the invention.
Figure 6D:
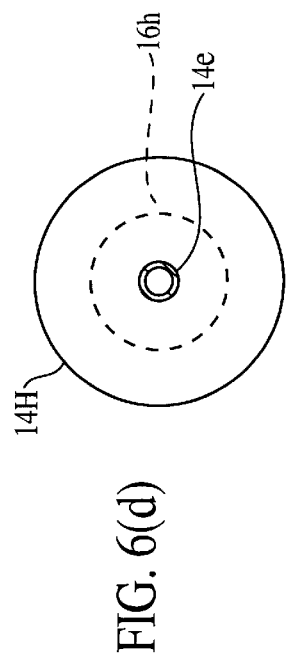
FIG. 6(d) illustrates an optical modulation element corresponding to the aperture element of FIG. 6(b)
Figure 6E:
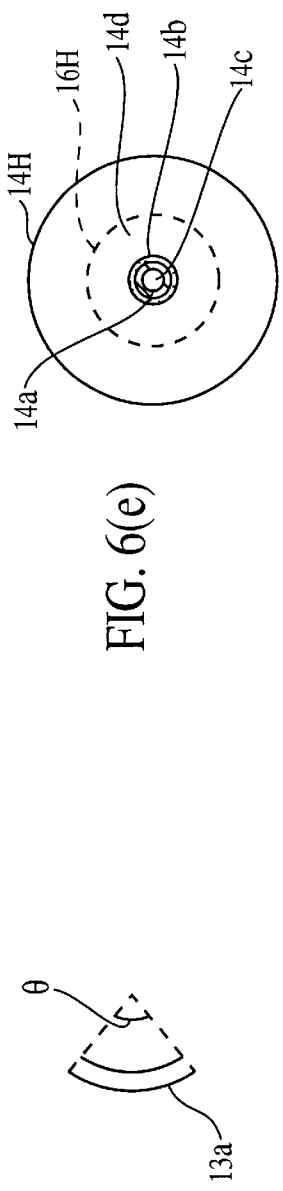
FIG. 6(e) is an example of an optical modulation element for use with a low magnification objective lens and the light aperture as in FIG. 2(b).
Figure 6B:
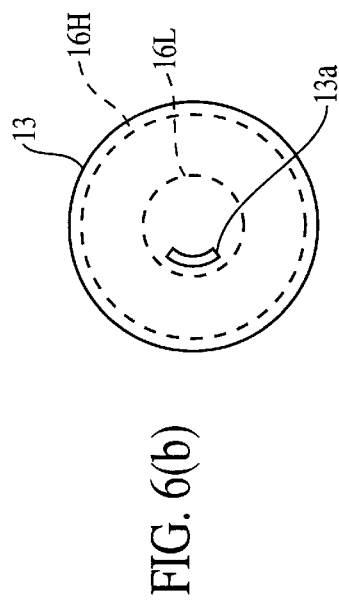
FIG. 6(b) illustrates an aperture element that is identical to that of FIG. 5(b)

FIGS. 5(a)–5(c) and 6(a)–6(c) illustrate the manner in which the first and the second objects of the invention are attained. FIG. 5(b) and FIG. 6(b) illustrate the identical aperture 13a that is arranged at pupil plane 8, in the case of objective lenses of both low and high magnification being used.

FIG. 5(d) illustrates optical modulation element 14L that is arranged at pupil plane 11 of the image-forming optical system in the case where the smallest numerical aperture objective lens is used (of multiple objective lenses that are available for use). FIG. 6(d) illustrates the optical modulation element 14H that is for use with the same aperture as illustrated in FIG. 5(b) or FIG. 6(b), but is used in the case where the objective lens to be used is one having a generally high magnification and a large numerical aperture.

In FIG. 5(d) and FIG. 6(d), a ring-shaped phase-shifter 14e having a diameter corresponding to aperture 13a is arranged. As stated previously, a common aperture element 13a is used both in the case of a low magnification objective lens (FIG. 5(b)) or a high magnification objective lens (FIG. 6(b)) and thus an exchanging operation of the apertures accompanying the switching of the objective lens becomes completely unnecessary.

In the case where the same aperture element is used with each of multiple objective lenses of different numerical aperture, the region on the optical modulation element that the zero-order light passes through becomes more narrow when a higher magnification objective lens is used, and there is no assurance that a sufficient quantity of light in the image will be maintained. Because of this, it is desirable to make the area of the aperture as large as possible in relation to a high magnification objective. However, this may cause a problem when a low magnification lens replaces the high magnification lens, in that the transmitting region for the zero-order light on the optical modulation element may conversely become too large. In order to use a common aperture with objective lenses that cover as wide a range of magnification as possible, aperture 13a of FIG. 5(b) or FIG. 6(b) may instead be arranged at a position separated as far as possible from the optical axis within the region 16L. This satisfies Equation (9). (This alternative arrangement of aperture 13a will be illustrated in later figures.)

In such a construction, in the case where the shape of the aperture is made to be a ring as in the usual phase contrast imaging technique, when a low magnification objective lens 10L is used, the region of the zero-order light on optical modulation element 14L becomes larger than that as illustrated in FIG. 10(c), and it becomes impossible to maintain the balance of the zero-order light and the diffracting light so as to achieve the most suitable phase contrast efficacy. Therefore, aperture 13a is made to be an angular segment of a ring (as illustrated in FIGS. 5(b) and 6(b)). Although the shape of the aperture is asymmetric in relation to the optical axis, since the region on the optical modulation elements is rotationally symmetric, no adjusting of the alignments of the apertures and the optical modulation elements is required.

Because the aperture is made to illuminate the sample from an off-axis position (the oblique illumination), by making it a shape that covers an angular segment of a circular ring, the resolving power and the contrast can be more increased on observation both with low magnification and also with high magnification, than those in the case where a ring slit is used that is made most suitable for low magnification use. Also, based on Equation (9) being satisfied, observation at a high resolving power at each magnification, and an objective lens of higher magnification can be used with one common aperture. In the case where Equation (9) is not satisfied, the effective numerical aperture becomes too small, especially when there is a high magnification objective lens used for observation, and the resolving power drops.

Also, when the smallest numerical aperture objective lens of those available for use is employed, the conjugating regions to the aperture are positioned at the most peripheral edge of the pupil of the image-forming optical system or in that vicinity. And, on the optical modulation elements, the light absorbing regions which include the regions conjugating to the aperture can be arranged as rings centered on the optical axis. A selected phase delay can also be provided at the light absorbing regions. In this case, in relation to the objective lenses with the smallest numerical aperture, apertures are positioned with the highest resolving power. Such an aperture is shown in FIG. 7(b). With objective lenses having the smallest numerical aperture, a modulation contrast efficacy can be obtained in the image.

Also, if the apertures are structured so that rotation about the optical axis is possible, the direction of contrast formation in the image changes. And, in case it is desired to change the direction of contrast formation in the image, adjustment at all of the optical modulation elements is not necessary.

Based on the above means, since equivalent apertures can be used in relation to multiple objective lenses, an exchanging operation of the apertures becomes unnecessary even when there is an exchanging of the objective lens. Moreover, when combined with the means for attaining the first object of the invention, an image can be attained that simultaneously provides a high imaging sensitivity, as in the phase contrast imaging technique, as well as a clear outline with a three-dimensional sense, as in the modulation contrast imaging technique.

SPECIFIC EXAMPLE #1

Below, a first example of the present invention that attains the first object of the invention is given.

FIG. 1(a) illustrates the layout of components and ray paths of the entire structure of an optical microscope that has optical modulation elements relating to the present invention. FIG. 1(b) illustrates an aperture element having a slit aperture. FIG. 1(c) illustrates a corresponding optical modulation element.

Figure 2B:
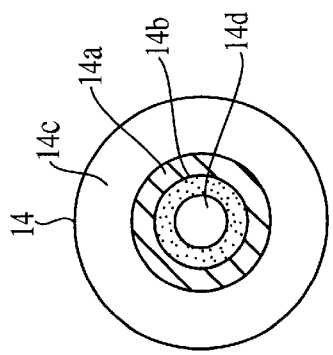
FIGS. 2(a)–2(h) illustrate other aperture elements and corresponding optical modulation elements according to the present invention, with FIGS. 2(a), 2(e) and 2(g) illustrating apertures of various shapes, and FIGS. 2(b), 2(f) and 2(h) being the respective optical modulation elements that correspond.
Figure 2C:
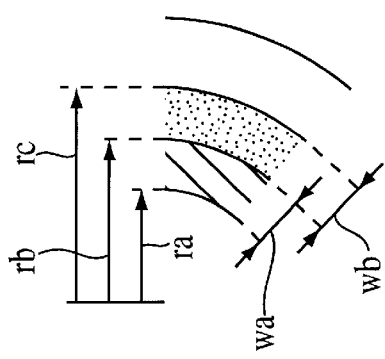
Figure 2D:
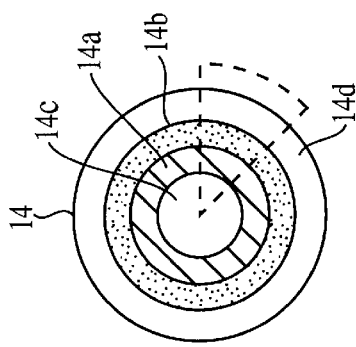
Figure 2F:
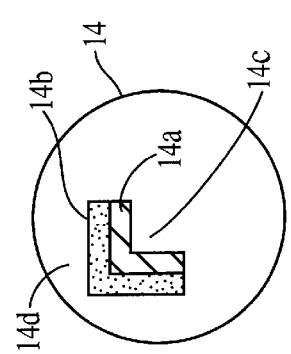
Figure 2H:
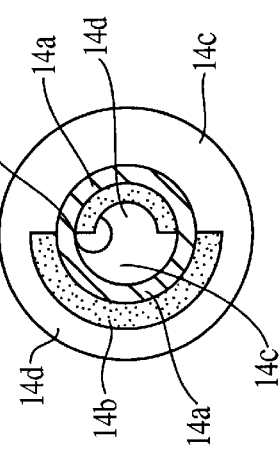
Figure 2A:
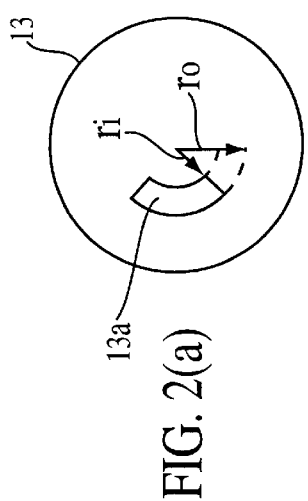
Figure 2E:
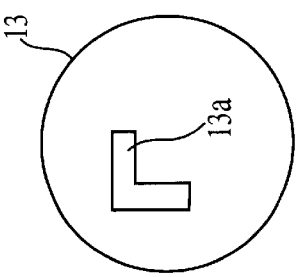
Figure 2G:
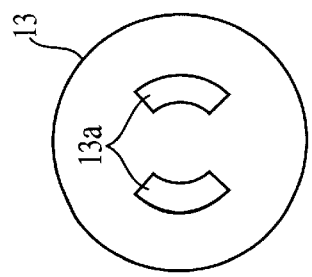

FIGS. 2(a), 2(e) and 2(g) illustrate other examples of aperture element 13 and FIGS. 2(b), 2(f) and 2(h) illustrate corresponding optical modulation element 14, respectively pertaining to an optical microscope that has optical modulation elements relating to the present invention. FIG. 2(d) is another example of an optical modulation element that can be used with the aperture element illustrated in FIG. 2(a), and FIG. 2(c) is a blow-up of the pie-shaped section shown in dashed lines in FIG. 2(b);

FIG. 1(b) illustrates one example of aperture element 13, and shows the region 13a where the light passes through. On the one hand, FIG. 1(c) shows an example of an optical modulation element corresponding to the aperture 13a of FIG. 1(b) in an optical microscope pertaining to the present invention. This optical modulation element has a first light absorbing region 14a of transmittance Ta, a second light absorbing region 14b of transmittance Tb, a first light transmitting region 14c of transmittance Tc, and a second light transmitting region 14d of transmittance Td, wherein the following conditions are satisfied.

$0.1 < Ta < 0.4$ $Tb < 0.01$ $Tc = Td > 0.9$

Also, in the first light absorbing region, a phase shift is provided of $\pi/2$ radians in relation to the other regions.

Furthermore, the first light transmitting region 14c and the second light transmitting region 14d can have the same transmittance and be contiguous in certain portions as shown in FIG. 2(f). Thus, independent existence of these two regions throughout the area of the optical modulation element as in FIG. 1(c) is not required. In short, in order to obtain efficacy of the present invention, the transmitting regions adjacent to the first light absorbing region 14a lie in a direction that is orthogonal to the optical axis and the region adjacent the second light absorbing region 14b lies in approximately the same orthogonal direction and must be a light transmitting region.

In the case where linear-shaped apertures as in FIG. 1(b) and optical modulation elements with asymmetric shapes in relation to the optical axis as in FIG. 1(c) are used, accompanying the exchanging of objective lens 10, the optical modulation element must be rotated so that region 14a on the optical modulation element(s) and aperture 13a of the aperture element are parallel. Thus, an operation must be performed that adjusts these alignments. Also, in the case where the direction of contrast in the image is desired to be changed, the optical modulation element(s) must be rotated. Thus, in such situations, the observer is usually required to perform an extremely bothersome operation.

However, when an aperture element as shown in FIG. 2(a) is used having an aperture shaped as an angular segment of a ring that is centered on the optical axis, and when the optical modulation element used is that shown in FIG. 2(b), a rotating adjustment of the optical modulation element becomes unnecessary by the observer when the objective lenses are exchanged.

In order to obtain the most suitable efficacy, there has already been explained that the width Wa of the first light absorbing region and the width Wb of the second light absorbing region should satisfy Equation (10). Concerning this, a specific example is given in relation to the case where aperture 13a of FIG. 2(a) and optical modulation element 14 of FIG. 2(b) are used. Furthermore, FIG. 2(c) illustrates, in greater detail, the angular segment enclosed by the dashed lines of FIG. 2(b).

The light flux from aperture 13a of FIG. 2(a) is made to have a numerical aperture in the range of 0.24–0.28. The inner radius ri and the outer radius ro of aperture 13a of FIG. 2(a) are given by the equations below:

$$ri = 0.24\,fc$$

$$ro = 0.28\,fc$$

wherein, fc is the focal distance of condenser lens 9.

Usually, in order that a first light absorbing region completely covers the conjugate image of the aperture, in comparing the above values, it is normal to set the inner radius ra of the first light absorbing region (FIG. 2(c)) as being slightly smaller than the inner radius ri of the aperture, and the outer radius rb of the first light absorbing region is set slightly larger than the outer radius ro of the aperture, whereby, $$ra = 0.23\,fo$$

$$rb = 0.29\,fo$$

wherein, fo is the focal distance of object lens 10.
Wa and Wb in equation (10) can be determined as follows.

$$Wa = rb - ra = 0.06 fo$$

$$Wb = rc - rb = rc - 0.29 fo$$

Therefore, the following condition is obtained from Equation (10).

$$0.3 fo < Wb < 0.12 fo$$

or, $$0.32\,fo < rc < 0.41\,fo$$

In short, as shown in the above conditions, the width of the second light absorbing region is established, and by this, the most suitable efficacy is obtained.

In the case of FIG. 2(b), the position on the optical modulation element 14 where the second light absorbing region 14b is arranged as shown on the outside of the first light absorbing region 14a. As illustrated in FIG. 2(d), the second light absorbing region 14b may also be arranged on the inside of the first light absorbing region. However, placing the second light absorbing region on the inside reverses the direction of contrast formation in the image where the same aperture, such as the aperture 13a of FIG. 2(a), is used.

Also, aperture 13a can alternatively be made to be multiple, as illustrate in FIG. 2(g), in order to increase the light quantity that illuminates the sample, and corresponding light absorbing regions can be formed on the optical modulation element as shown in FIG. 2(h).

Figure 3:
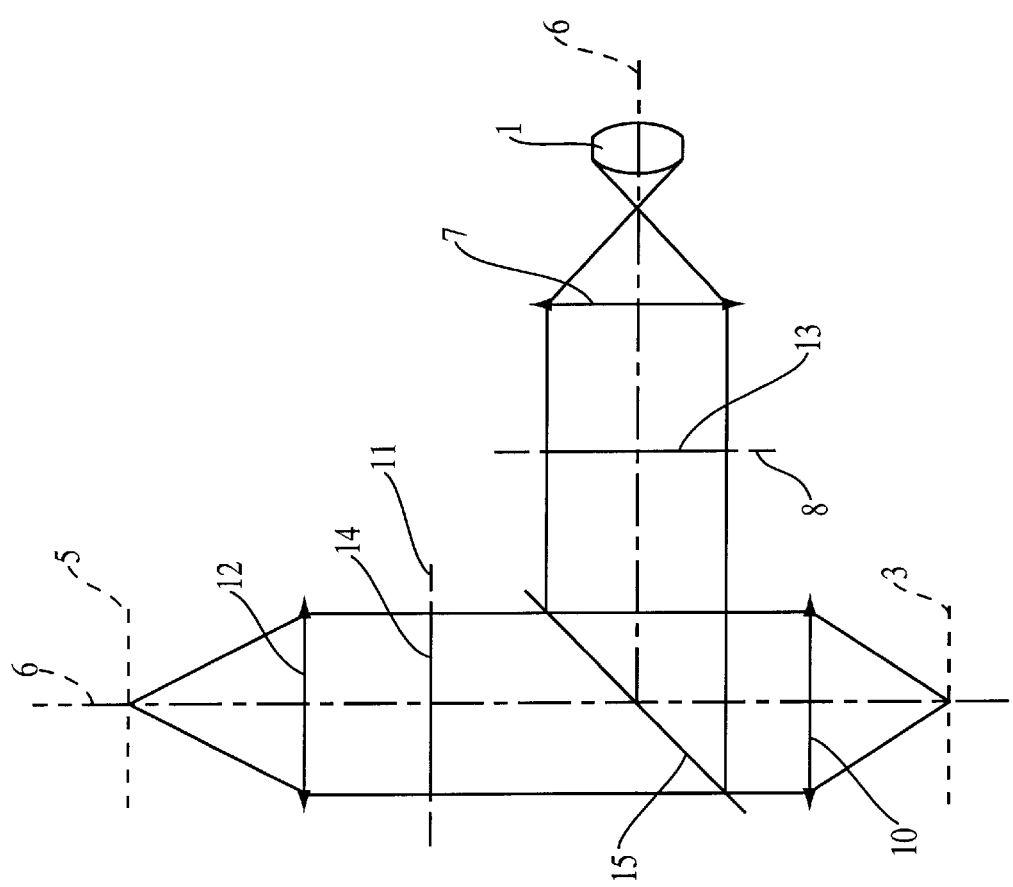
FIG. 3 illustrates the layout of components and ray paths of an optical system of an optical microscope for viewing an object in reflected light which uses the present invention. The optical microscope includes a beam splitter, an illuminating optical system, and an image-forming optical system and additionally has an aperture element and a corresponding optical modulation element of the present invention.

The present invention can also readily be used with microscopes that view an image using reflected light, as illustrated in FIG. 3. The components in FIG. 3 are labeled with the same numbers as listed for FIG. 1, with the exception of new item 15 which is a beam splitter.

Also, as shown in FIG. 4(a), pupil plane 11 of the image-forming optical system can be relayed to relayed pupil plane 11', and another optical modulation element can also be positioned at relayed pupil plane 11'. Moreover, different regions on a single optical modulation element can be partitioned among two optical modulation elements and arranged at pupil planes 11 and 11'. FIGS. 4(b) and FIG. 4(c) illustrate examples of partitioning the light control regions illustrated in FIG. 2(b). Region 14a and 14c are partitioned and arranged at pupil plane 11, and regions 14b and 14d are partitioned and arranged at relayed pupil plane 11'.

SPECIFIC EXAMPLE #2

A specific example for realizing the first and second objects of the present invention will now be described for objective lenses [1]–[4] which may be selected for viewing with the magnifications and numerical apertures (NA), as set forth below.

[1] Magnification 10×, NA 0.25
[2] Magnification 20×, NA 0.4
[3] Magnification 40×, NA 0.6
[4] Magnification 60×, NA 0.9

FIG. 5(a) and FIG. 6(a) illustrate the components and ray paths for a portion of the illuminating optical system according to the present invention for the case of a low magnification objective lens and a high magnification objective lens, respectively. FIG. 5(b) and FIG. 6(b) illustrate an identical aperture that is arranged at pupil plane 8 of the illuminating optical system for each case of magnification.

Dashed line 16L illustrates the range of the light flux which can enter the objective lens when the smallest numerical aperture objective lens is used. More specifically, the effective light flux is shown when the objective lens [1] above is used. Also, dashed line 16H shows the range of the light flux when a high magnification objective lens is used.

More specifically, the effective light flux is shown when the objective lens [4] above is used. As one example of apertures of FIG. 5(b) and FIG. 6(b), aperture 13a is given a range of numerical aperture from 0.18–0.2. Equation (9) is satisfied since NAc=0.2 and NAo=0.25. Below are the ranges that the first light absorbing region 14a should cover for each of the objective lenses [1']–[4'] (corresponding to lenses [1]–[4]), given as a percentage relating to the numerical aperture of each objective lens.

[1'] About 72%–80%
[2'] About 45%–50%
[3'] About 30%–33%
[4'] About 20%–22%

FIG. 5(d) and FIG. 6(d) illustrate the ring-shaped phase shifters on the optical modulation elements 14L and 14H, for objective lenses [1] and [4] respectively.

Therefore, a common aperture element 13 having an aperture 13a as illustrated in FIG. 5(b) and FIG. 6(b) is used for each of objective lenses [1]–[4]. This allows the magnification to be frequently switched without it being necessary to perform an exchanging operation of the apertures. In this example the magnification can vary from a range of 10 times to 60 times and the numerical aperture can vary from 0.25–0.9, and the same aperture element is used for each objective lens. Also, because the region on the optical modulation elements is a ring, even if the aperture is positioned to rotate about the optical axis, an adjustment of the positions of the optical modulation elements is not necessary. Therefore, the labor of the observer is greatly reduced, and an effective observation can be performed.

Also, since the aperture shape is an angular sector of a ring, a high efficacy of phase contrast can be obtained even when a low magnification objective lens is used because of the effect of the oblique illumination.

By the use of the optical modulation elements as illustrated in FIG. 2(b), observations that combine the previously mentioned phase contrast imaging technique and the modulation contrast imaging technique can be performed simultaneously. In short, along with the operation becoming unnecessary for such things as exchange and adjustment of the apertures, there is good sensitivity provided in imaging structures of transparent samples, and samples can be observed having a clear outline and three-dimensional sense. In the above cases, the optical modulation elements corresponding to objective lenses [1] and [4] are shown in FIG. 5(e) and FIG. 6(e), respectively.

Also, by making the relative positions, shapes, and varieties of each region on the optical modulation elements that are used in relation to objective lenses of all magnifications in use to be uniform, the formation of contrast in the image becomes common for each objective lens in use.

Figure 6C:
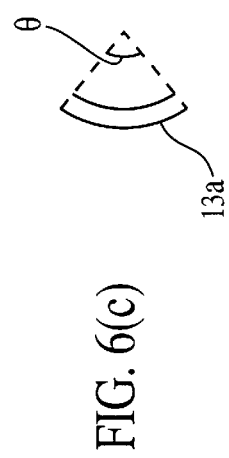
FIG. 6(c) illustrates details of the aperture element of FIG. 6(b).

FIG. 5(c) and FIG. 6(c) are expanded views of the aperture 13a of FIG. 5(b) and FIG. 6(b), respectively. Based on the angle θ, where θ is the angle subtended by the angular segment of a circular ring that forms the aperture, the effect of the oblique illumination changes. A value of θ in the range of approximately 60°–120° is thought to be the most suitable. When θ is smaller than 60°, the light quantity from small objects is insufficient. This is especially the case with a high magnification objective lens, because the proportion of light occupying the pupil of a zero-order light region becomes smaller than when a low magnification objective lens is used. Thus, the insufficiency of light quantity when using a high magnification lens becomes readily apparent. On the other hand, when θ is greater than 120°, the oblique illumination becomes vague, and the image contrast drops.

However, in the case of a construction as that above, when there is high magnification observation as previously mentioned, the image has a tendency to become dark, and because the zero-order light also passes through a region of the optical modulation element that is near the optical axis, the efficacy pertaining to the optical modulation element is also low, and a good resolving power is difficult to obtain. However, upon arranging aperture 13a as shown in FIG. 7(b) to lie just within the outermost perimeter of light flux 16L (i.e., most outward from the optical axis while still being within light flux 16L), the efficacy pertaining to the optical modulation element increases since the proportion of zero order light that is passed by such an aperture is greater than when the apertures of FIG. 5(b) or FIG. 6(b) are used. Also, the resolution increases because the effect of the oblique illumination becomes greater.

As one example, in relation to the objective lenses [1]–[4] above, an aperture of the shape of FIG. 7(b) having a numerical aperture in the range of 0.22–0.25 may be used. Below are the ranges that the first light absorbing region 14a or the phase-shifter should cover on the optical modulation element shown in FIG. 2(b) for each of the above numbered objective lenses, given as a percentage relating to the numerical aperture of each objective lens.

[1"] About 88–100%
[2"] About 55–63%
[3"] About 37–42%
[4"] About 24–28%

The figure modeled after the equations when the optical modulation element of FIG. 2(b) is used with objective lens [4] is illustrated in FIG. 8(c).

In [4'] just as in [4"] above, the transmitting region of the zero-order light is near the center portion of the pupil in the vicinity of the optical axis of the image-forming optical system (i.e., of the objective lens). Because the transmitting region of the zero order light is further from the optical axis in [4"] than in [4'], the efficacy of the optical modulation element is greater.

However, as for the case where an aperture such as that of FIG. 7(b) is used with some low magnification objective lenses, an optical modulation element such as that shown in FIG. 2(b) cannot be used. This is because the FIG. 2(b) structure prepares light transmitting regions and light absorbing regions on the outsides of the regions corresponding to apertures. Therefore one can use the optical modulation element such as that shown in FIG. 7(c) when the lowest magnification objective lens is used.

Figure 7A:
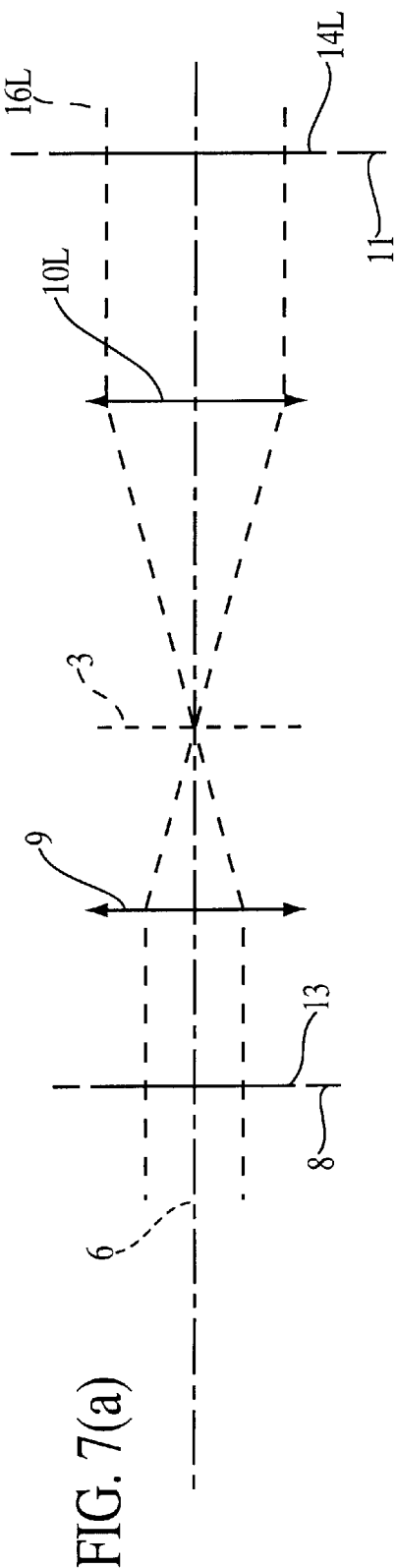
FIGS. 7(a)–7(c) illustrate another example in the case where a low magnification objective lens is used for attaining the second object of the present invention.
Figure 7C:
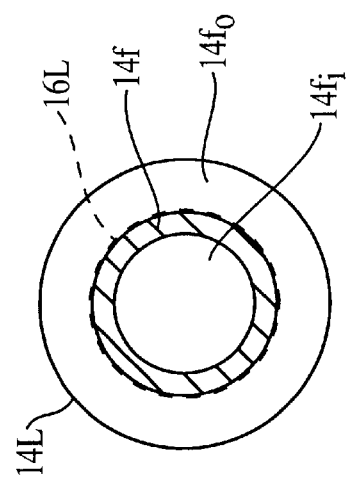
Figure 7B:
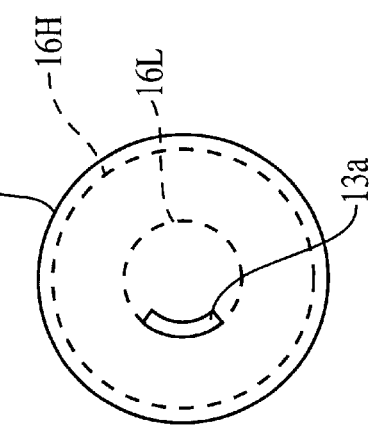

In FIG. 7(c), 14f is a light absorbing ring region, and can provide a phase shift. Direct light from the aperture passes through this region. Region 14fo, located outward of this region, is outside the pupil of the objective lens. As a result, no light passes through. Therefore when the transmittance is established to be high in the region 14fi (which is on the inside of region 14f), modulation contrast in the image can be attained because these regions become structures equivalent to the normal modulation contrast imaging technique. Thus, the aperture element of FIG. 7(b) may be used over the full range objective lenses while providing a modulation contrast imaging efficacy during use of the lowest magnification objective lens and providing both a modulation contrast imaging efficacy and a phase contrast imaging efficacy during use of the other objective lenses.

While the invention has been illustrated and described with reference to preferred embodiments, the invention is not limited thereto. Instead, the scope of the invention is to be defined by the following claims and their legal equivalents. Further, all such modifications as would be obvious to one of ordinary skill in the art are intended to be within the scope of the following claims.

What is claimed is:

1. In combination, an aperture element for an optical microscope having an aperture in the shape of an angular segment of a ring, and an optical modulation element for the optical microscope having a light attenuating region in the shape of a ring, wherein
   said optical microscope includes an illuminating optical system and an image-forming optical system,
   said light attenuating region also imparts a predetermined phase retardation to light passing therethrough,
   said aperture element is positioned at a pupil plane of said illuminating optical system and said optical modulation element is positioned at or near a pupil plane of said image-forming optical system, whereby light which passes through the aperture is incident on a sample and then diffracted by said sample, the diffracted light including a zero-order light component and said zero order light is incident on the light attenuating region of the optical modulation element,
   said optical microscope includes multiple objective lenses having a range of numerical apertures for viewing a sample using a selected objective lens at a selected magnification,
   only one said aperture element is used in common with each said objective lens,
   and the following conditional equation is satisfied $NAc > 0.7\ NAo$ where
   NAc is the numerical aperture value subtended by the region of said aperture having the smallest angular subtense from the sample surface, and
   NAo is the numerical aperture of the lens having the smallest numerical aperture value of said multiple objective lenses.

2. The combination set forth in claim 1, wherein:
   when the objective lens having the smallest numerical aperture value is used, a part of said light attenuating region is positioned at a circumference region of a pupil of said image-forming optical system.

3. The combination as recited in claim 1, said aperture element being rotatable about the optical axis.

4. The apparatus as set forth in claim 2, said aperture element being rotatable about the optical axis.

5. In combination, an aperture element for an optical microscope having an aperture in the shape of an angular segment of a ring, and an optical modulation element for the optical microscope having a light attenuating region in the shape of a ring, said optical microscope including an illuminating optical system and an image-forming optical system, wherein
   said optical modulation element imparts a predetermined phase retardation to light passing through either said light attenuation region or all other regions of the optical modulation element,
   said aperture element is positioned at a pupil plane of said illuminating optical system and said optical modulation element is positioned at or near a pupil plane of said image-forming optical system, whereby light which passes through the aperture is incident on a sample and then diffracted by said sample, the diffracted light including a zero-order light component and said zero-order light is incident on the light attenuating region of the optical modulation element,
   said optical microscope includes multiple objective lenses having a range of numerical apertures for viewing a sample using a selected objective lens at a selected magnification, only one said aperture element being used in common with a selected objective lens,
   and the following conditional equation is satisfied $NAc > 0.7\ NAo$ where
   NAc is the numerical aperture value subtended by the region of said aperture having the smallest angular subtense from the sample surface, and
   NAo is the numerical aperture of the lens having the smallest numerical aperture value of said multiple objective lenses.

6. The combination set forth in claim 5, wherein:
   when the objective lens having the smallest numerical aperture value is used, a part of said light attenuating region is positioned at a circumference region of a pupil of said image-forming optical system.

7. The combination as recited in claim 5, said aperture element being rotatable about the optical axis.

8. The apparatus as set forth in claim 6, said aperture element being rotatable about the optical axis.

9. In combination, an aperture element for an optical microscope having an aperture in the shape of an angular segment of a ring, and an optical modulation element for the optical microscope having a light attenuating region in the shape of a ring, said optical microscope including an illuminating optical system and an image-forming optical system,
   wherein
   said optical modulation element imparts a predetermined phase retardation to light passing through either said light attenuation region or all other regions of the optical modulation element,
   said aperture element is positioned at a pupil plane of said illuminating optical system and said optical modulation element is positioned at or near a pupil plane of said image-forming optical system, whereby light passes through the aperture, is incident on a sample and diffracted, and light diffracted into the zero-order is incident on the light attenuating region of the optical modulation element, and
   said optical microscope includes multiple objective lenses having a range of numerical apertures for viewing a sample using a selected objective lens at a selected magnification, only one said aperture element being used in common with a selected objective lens.

10. In an optical microscope, the improvement of:
    providing an aperture element having an aperture therein shaped as an angular segment of a ring;
    providing first and second optical modulation elements at planes that are conjugate to said aperture element, wherein light that passes through the aperture is incident on a sample, is diffracted, and the zero-order diffracted light then passes through said first optical modulation element that imparts one of an attenuation, a predetermined phase-retardation to the zero-order diffracted light, or a predetermined phase-retardation to all other light incident on said first optical modulation element; and
    (a) in the case where the first optical modulation element imparts an attenuation, the second optical modulation element imparts a phase retardation to either the zero-order diffracted light or to all other light that is incident on said second modulation element; or
    (b) in the cases where the first optical modulation element imparts a phase-retardation, the second optical modulation element imparts an attenuation to said zero-order diffracted light.

* * * * *

UNITED STATES PATENT AND TRADEMARK OFFICE
CERTIFICATE OF CORRECTION

PATENT NO : 6,130,776
DATED : Oct. 10, 2000
INVENTOR(S): Takaoka

It is certified that error appears in the above-identified patent and that said Letters Patent are hereby corrected as shown below:

At column 14, change line 3 to: $0.03fo < Wb < 0.12fo$

Signed and Sealed this

Eighth Day of May, 2001

NICHOLAS P. GODICI

*Attest:*

*Attesting Officer*     *Acting Director of the United States Patent and Trademark Office*